3,825,624
WATER-SOLUBLE SIZING AGENT
Kakichi Hirai, Ninomiya-machi, Hideo Hayashi, Yokohama, and Yoichi Hiratsuka, Kawasaki, Japan, assignors to Nippon Petrochemicals Co., Ltd., Tokyo, Japan
Continuation-in-part of application Ser. No. 681,195, Nov. 7, 1967, which is a continuation-in-part of application Ser. No. 281,448, May 10, 1963, both now abandoned. This application Jan. 21, 1972, Ser. No. 219,646
Claims priority, application Japan, May 23, 1962, 37/20,378
Int. Cl. C08f 19/00
U.S. Cl. 260—879                                      2 Claims

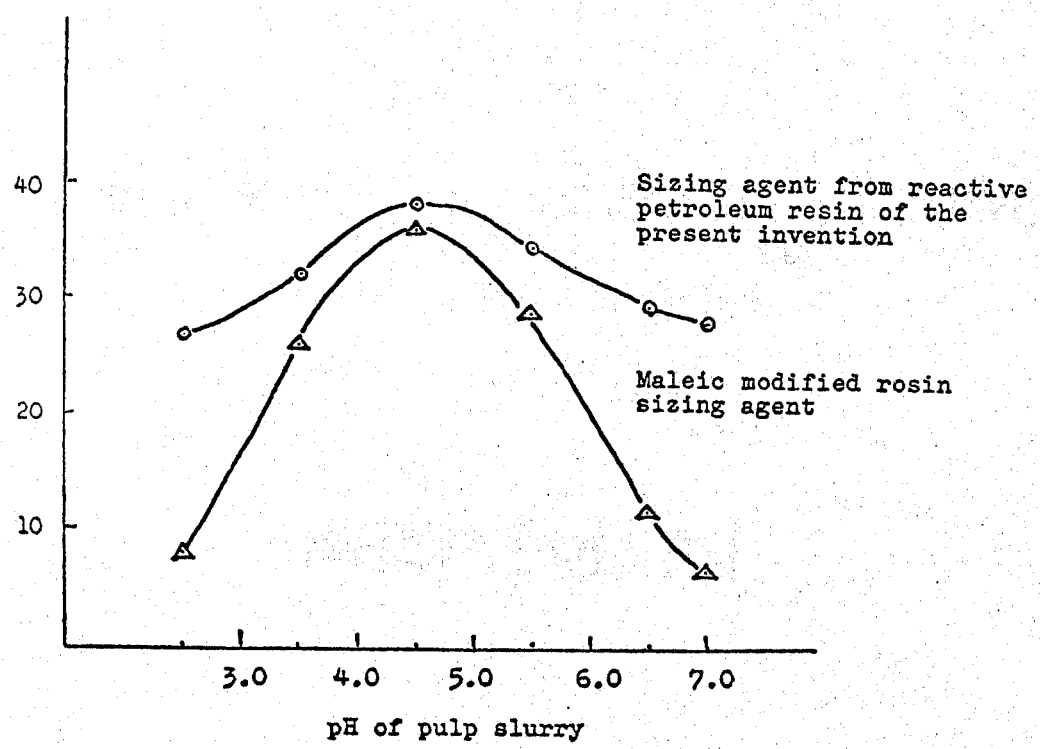

ABSTRACT OF THE DISCLOSURE

A water-soluble sizing agent obtained by reacting the resin with unsaturated carboxylic acid; said resin being prepared by polymerizing hydrocarbon mixture of a thermally cracked petroleum oil fraction having an unsaturated aromatic hydrocarbon content in the range of 15 to 80% by weight and conjugated diolefin content in the range of 20 to 85% by weight in the presence of boron triflouride catalyst.

---

This application is a continuaiton-in-part of copending continuation-in-part application, Ser. No. 681,195, filed Nov. 7, 1967, now abandoned of parent application, Ser. No. 281,448, filed May 10, 1963, now abandoned.

This invention relates to a useful water-soluble sizing agent and more particularly a water-soluble sizing agent obtained by reacting the reactive petroleum resin with unsaturated carboxylic acid; said resin being prepared by polymerizing hydrocarbon mixture of a thermally cracked petroleum oil fraction having an unsaturated aromatic content defined hereinafter in the range of 15 to 80% by weight and conjugated diolefin content in the range of 20 to 85% by weight in the presence of boron trifluoride catalyst.

It is well known that certain petroleum resins are useful for producing coating compositions, floor tiles, printing inks, etc., and are made by polymerizing various petroleum fractions boiling within the range of 20° C. to 300° C. Such fractions are obtained from thermal cracking of petroleum cuts and consist of olefins, diolefins and various aromatic, paraffinic and naphthenic hydrocarbons. Polymerization is effected by a Friedel-Crafts type catalyst. However, petroleum resins obtained by such processes are low in unsaturation, only silghtly reactive, and are pale in color or have a high softening point. Petroleum resins obtained by the prior art processes have also been used as paper sizing agents by emulsifying them with a suitable emulsifying agent. However, such petroleum resins, unlike natural resin type sizing agents, are difficult to emulsify, and their emulsions are unstable. Thus, uniform sizing with such resins is difficult and sizing effects of these resins are prohibitively lower than those of natural rosin type sizing agents.

Further, it is known that natural resin readily accepts the addition of polar groups, thus producing an addition product completely soluble in water and having excellent sizing effects. However, the optimum pH for sizing with the natural rosin type sizing agent is about 4.5, and the sizing effects of the natural rosin type sizing agent sharply decline when the pH rises above or decreases below the optimum pH of 4.5. Thus, natural rosin type sizing agents lose their practical sizing effects at about pH 2 and pH 7. Accordingly, while favorable sizing effects are obtained in the sizing of coniferous or soft wood pulp wherein the pH is maintained at about 4.5, the sizing of latifoliate or hard wood pulp wherein the pH approaches 7 is difficult. The use of fillers with the latter pulp to give toughness to paper renders the sizing effects of natural rosin type sizing agent very low. In addition, in the region of such critical pH, sizing effects are not increased by the addition of natural rosin type sizing agent in increased amount, and special conditions are said necessary to obtain desired sizing results.

With respect to prior art petroleum resins, such resins have little reactivity, making it difficult to add polar groups to them. And even if polar groups are added under severe reaction conditions, the product is not sufficiently water-soluble, and the product obtained does not produce sizing effects comparable to those of natural rosin type sizing agents.

Thus, prior to the present invention, no reliable process was known by which one could produce a reactive petroleum resin which readily accepts the addition of polar groups thus providing a paper sizing agent which is completely soluble in water and which has higher sizing effects than those of a natural rosin type sizing agent.

Therefore, it is the object of this invention to obtain a reactive petroleum resin readily accepting the addition of polar groups, such modified resin being highly soluble in water and providing excellent sizing effects to paper.

It is a further object of this invention to obtain a sizing agent from petroleum resin which gives excellent effects to low grade paper as well as high quality paper, and which imparts a greater tensile strength to paper than do previously known petroleum resins or natural rosin sizes.

Another object of the invention is the increasing of the pH range in which sizing effects are practically significant by producing a unique petroleum resin size of high solubility.

The reactive petroleum resin from which the sizing agent of the invention is produced is characterized as being of pale color, high unsaturation and a softening point of from 10° C. to 150° C. Further, polar groups can be easily added to the reactive resin to obtain a modified product which is substantially completely soluble in water and thus highly useful as a paper sizing agent. The raw material from which the reactive resin is made comprises distillate boiling in the range of 20° C. to 280° C. from the by-product fractions obtained in the production of unsaturated monomers such as ethylene, propylene, butenes, butadiene and the like by thermal cracking, e.g., steam-cracking, vapor-phase thermal cracking and sand-cracking, or by the catalytic cracking of light or heavy naphtha fraction, kerosene fraction, gas oil, residual oil or crude oil, or a mixture of sub-divided distillate fractions within said boiling range in suitable proportions as is defined below. Such raw material is polymerized using a boron trifluoride catalyst, which is decomposed and removed after completion of the polymerization reaction. The resultant mixture is then washed with water, and unreacted fractions and low molecular polymers are removed by distillation or evaporation.

The fraction boiling at 20° C. to 280° C. obtained as a by-product in the production of the aforementioned unsaturated monomers by thermal cracking or catalytic cracking contains various valuable components, such as diolefins, e.g. cyclopentadiene, isoprene, piperylene, monoolefins, e.g., cyclopentene, in the $C_5$ fraction, cyclo- and aliphatic-diolefins, e.g., methylcyclopentadiene, dicyclopentadiene, aliphatic monoolefins, e.g., hexenes, and aromatic hydrocarbons having unsaturated hydrocarbon side chains, e.g., styrene, indene, and derivatives thereof (the latter hydrocarbons will be referred to as "unsaturated aromatic hydrocarbons" hereinafter) in the $C_6$ and higher fractions.

The invention is characterized in that cyclo- and aliphatic-diolefins and cyclo- and aliphatic-monoolefins are copolymerized with "unsaturated aromatic hydrocarbons." Gas chromatographic investigation reveals that some alkylation and condensation occurs in the process. However, the predominant reaction is polymerization which produces a reactive petroleum resin having a sufficient unsaturation to readily permit the addition of polar groups thereto and containing aromatic rings.

The reactive petroleum resin obtained according to the process of the present invention has a bromine number of above 45 (determined by ASTM D–1158–57T using 4 grams of sample) and high unsaturation thus permitting the addition of polar groups by conventional chemical methods under mild reaction conditions. The resultant addition product is substantially completely soluble in water and can be used as paper sizing agent without further treatment.

As is evident from FIG. 1, unlike natural rosin type sizing agents, sizing agent derived from the reactive petroleum resin of the present invention is not subject to substantial lowering of sizing effects by change in pH within the pH range of 2 to 7. Thus, in a wide pH range, sizing effects heretofore unobtainable by the use of natural rosin type sizing agent can be obtained with the sizing agent of the present invention. Also, as is evident from Table I in Example V, the sizing effects of the inventive sizing agent are increased by increasing the quantity of agent so that even with a paper pulp solution of pH 4.5, better sizing effects than those of natural rosin type sizing agent are obtainable. Thus, sizing agent derived from the reactive petroleum resin of the present invention produces excellent sizing effects irrespective of the nature of the pulp employed, i.e. coniferous or soft wood pulp, latifoliate or hard wood pulp.

The raw material used in the invention is a mixture of a $C_5$ fraction and a fraction having boiling range from 140° C. to 200° C., said fractions being obtained by fractionating a thermally cracked petroleum oil fraction containing unsaturated hydrocarbon and having a boiling point ranging from 20° C. to 280° C. It is essential, moreover, that the raw material contain the proper proportion of "unsaturated aromatics" and diolefins, as set out infra.

To illustrate, a $C_5$ fraction was polymerized using a Friedel-Crafts type catalyst, for example boron trifluoride, and to the petroleum resin obtained polar groups were added. The resultant addition product was completely soluble in water, but its sizing effects were inferior to those of natural rosin type sizing agent, particularly in weak sizing. However, when the same $C_5$ fraction was mixed with unsaturated aromatic hydrocarbons and polymerized using a Friedel-Crafts type catalyst followed by the addition of polar groups, the resultant addition product was completely soluble in water and the sizing effects increased with the increase of the proportion of the unsaturated aromatic hydrocarbons. However, an excessive amount of unsaturated aromatic hydrocarbons when admixed with the $C_5$ fraction renders the addition of polar groups difficult and thus results in insubstantial water solubility and poor sizing effects.

From the above facts, it was found that polar groups attach to the unsaturated bonds other than the aromatic rings and render the resultant addition product watersoluble while the aromatic rings in the resin molecule augment the sizing effects. The essence of the process of the present invention is that the "unsaturated aromatic hydrocarbons" are copolymerized with cyclo and aliphatic diolefins and cyclo and aliphatic monoolefins to produce a petroleum resin of such molecular structure, while maintaining the ratio of aromatic rings to unsaturated bonds, other than those in the aromatic rings, in an appropriate range.

As a result of our investigations outlined above, we have found that successful results are attained when the raw material employed satisfies the following requirements:

(1) The "unsaturated aromatic hydrocarbon" content as defined by the following formula should be within the range of 15% to 80%

Unsaturated aromatic hydrocarbon content $$= \frac{\text{Percent by weight of unsaturated aromatic hydrocarbons}}{\text{Percent by weight of olefins}^a + \text{percent by weight of conjugated diolefins}} \times 100$$

(2) The conjugated diolefin content as defined by the following formula should be with the range of 20% to 85%

Conjugated diolefin content $$= \frac{\text{Percent by weight of conjugated diolefins}}{\text{Percent by weight of olefins}^a + \text{percent by weight of conjugated diolefins}} \times 100$$

or, in the alternative, (3) Diene value index as defined by the following formula should be within the range of 15 to 80

$$\text{Diene value index} = \frac{\text{Diene value }^c/254}{\text{Bromine number }^b/160} \times 100$$

A suitable raw material is prepared from a distillate having a boiling range of 20° to 280° C., as set out above. Said distillate is fractionated into several subdistillates and the subdistillates are then combined in suitable proportions. For example, distillate having the boiling range of 20° to 280° C. is fractionated into $C_5$ fraction, a benzene-toluene-xylene fraction, and higher boiling fractions having boiling ranges of 145°–160° C., 145° C.–180° C., 140°–200° C., etc. The higher boiling fraction is admixed with the $C_5$ fraction above described. Moreover, cyclo- or aliphatic conjugated diolefins, such as isoprene, piperlene, cyclo-pentadiene, dicyclopentadiene or fractions rich in such conjugated diolefins can be added to the mixture said above in proportions which meet the requirement above set out. Alternatively, unsaturated aromatic hydrocarbon such as styrene, α-methylstyrene, indene can be added to the mixture said above either alone or in combination.

To such admixture is added 0.01 to 5% by weight of a boron-trifluoride catalyst, for example, boron trifluoride, its ether or phenol complex. The material is polymerized under atmospheric or elevated pressure at a temperature of —30° C. to +80° C. for 10 minutes to 24 hours. The catalyst is then decomposed by a basic agent, such as the alkali sodium hydroxide or sodium carbonate, and removed. The reaction mixture is then washed with water. Unreacted oil and low molecular polymers formed are removed by evaporation or distillation. A reactive petroleum resin, pale in color, rich in unsaturation and having a softening point of 10° C. to 150° C. is thereby obtained. To this resin, polar groups are added as set out infra and the resultant product is completely soluble in water and exhibits sizing effects superior to those of natural rosin type sizing agent, as described above.

In the above formulas (for the calculation of "unsaturated aromatic hydrocarbon" content, conjugated diolefin content and diene value index) saturated aliphatic

---

[a] Olefin includes "unsaturated aromatic hydrocarbons" and non-conjugated diolefins.
[b] Bromine number determined by ASTM 1158/57T.
[c] Diene value is determined as follows: To 2–5 ml. of sample, 20 ml. of saturated benzene solution of maleic anhydride are added. Then, 0.5 ml. of 0.1 N iodine solution is added to the solution as catalyst and the mixture is reacted at 80° C. for 30 minutes. Then, distilled water is added to the reaction mixture to convert the unreacted maleic anhydride to maleic acid, which is extracted with distilled water and determined by titration with 0.5 N aqueous caustic soda.

hydrocarbons, benzene and aromatic hydrocarbons having saturated aliphatic side chains which do not enter the polymerization reaction are excluded. Such saturated hydrocarbons merely lower the yield of the reactive petroleum resin based on the total starting material. Those hydrocarbons which do not enter the polymerization reaction suppress the exothermic heat of the polymerization reaction.

When the content of "unsaturated aromatic hydrocarbon" exceeds the upper limit of 80%, water-solubility of the sizing agent is unduly low. On the other hand, when the content falls below 15%, sizing effects of the sizing agent fall far below those of natural rosin type sizing agent. Also, when the conjugated diene content exceeds the upper limit of 85%, or the diene value index exceeds the upper limit of 80, sizing effects of the sizing agent derived from such petroleum resin fall far below the sizing effects of natural rosin type sizing agent. Further, when the conjugated diene content is below 20% or when the diene value index is below 15, water-solubility is unduly low.

A sizing agent which is perfectly water-soluble and having a sizing effect which is more excellent than that of natural rosin series sizing agent from the reactive petroleum resin thus obtained, is prepared by adding 3–15 parts by weight of reagent having, as polar group(s), carboxyl group, dibasic acid anhydride groups, etc., such as acrylic, methacrylic, maleic or tetrahydrophthalic acid, or maleic or tetrahydrophthalic anhydride group, etc., to 100 parts by weight of said reactive petroleum resin, with or without adding thereto 0.01–2 weight percent of peroxide catalyst, and reacting at a temperature ranging from 100 to 250° C., optimally 130 to 200° C., for 0.5 to 15 hours, optimally 3 to 7 hours so as to add a polar group to the reactive petroleum resin.

Preferably a mixture consisting of 0 to 20 parts by weight of maleic rosin (amount of maleic anhydride added per 1 mol of rosin is 0.1 to 1.0 mol) and 10 to 70 parts by weight of rosin with an addition of alkaline solution necessary to saponify the above material, is added to 100 parts by weight of the reactive petroleum resin, to which the polar group has been added, whereupon, after agitating the mixture at a temperature below 100° C., a water soluble sizing agent is obtained.

The sizing agent obtained in this manner is perfectly water soluble, and has a sizing effect superior to that of the sizing agents of natural rosin series.

Examples illustrating the process of the present invention are set forth below. Such examples are presently preferred embodiments and in no way limit the invention, which may be varied by the art-skilled without departing from the spirit of the invention. All percentages are by weight.

EXAMPLE I

A fraction boiling at 20° to 280° C. (obtained as a by-product from steam cracking of petroleum naphtha) is distilled and separated into the $C_5$ fraction and a residual and a residual fraction containing $C_6$ and higher fractions boiling up to 280° C. The residual fraction is distilled to separate the benzene-toluene-xylene fraction and the remaining oil is distilled to obtain a fraction having an Engler boiling range of 145° to 200° C. 60% by weight of the latter fraction are mixed with 40% by weight of the $C_5$ fraction to make up the starting material. Such starting material has a diene value index of 20.2 and an "unsaturated aromatic hydrocarbon" content of 57%, and is admixed with 0.8% by weight of boron trifluoride-ethyl ether complex and reacted at 40° C. under one atmospheric pressure for five hours. The reaction mixture is neutralized with sodium carbonate and the catalyst is removed by water washing. Unreacted oil and low molecular polymers are removed by distillation under atmospheric pressure and further by steam distillation.

A reactive petroleum resin having a softening point of 72° C. (ASTM D-36-26), Barrett color of C-1½ and a bromine number of 55 is obtained. Yield is 39% by weight based on starting material. 5 weight parts of maleic anhydride is added to 100 weight parts of the reactive petroleum resin thus prepared, the mixture is heated to a temperature of 200° C. and is allowed to react for 5 hours. An alkaline solution, obtained by dissolving 11.5 weight parts of potassium hydroxide in 130 weight parts of water, is added to the thus obtained mixture consisting of 100 weight parts of the resin, which has had maleic anhydride added thereto, and 30 parts by weight of resin (saponification value 170), continuing agitation at 85° C. for 3 hours, whereby a uniform, transparent, concentrated sizing agent is obtained. By adding further thereto 162.5 weight parts of water, a water-solution having 30 weight percent of solid content is obtained. This solution has a light brownish color and is perfectly transparent, and when said solution is diluted into water with a solid content of 2 weight percent, the resulting aqueous solution is also perfectly transparent, and the pH is 9.3.

EXAMPLE II

A fraction boiling at 20° to 280° C. obtained as a by-product from steam cracking of petroleum naphtha is distilled and separated into a $C_5$ fraction and a residual fraction containing the $C_6$ and higher fractions and boiling up to 280° C. The residual fraction is distilled to separate the benzene-toluene-xylene fraction and the remaining oil is distilled to obtain a fraction having an Engler boiling range of 140° to 180° C. 20% by weight of the latter fraction is mixed with 80% by weight of the $C_5$ fraction from which cyclopentadiene has been removed, to make a starting material having a conjugated diolefin content of 42% and an unsaturated aromatic hydrocarbon content of 20%. The starting material is admixed with 0.4% by weight of boron trifluoride-ethyl ether complex and is reacted at 30° C. under a pressure of two atmospheres for 15 hours. The reaction mixture is neutralized with sodium hydroxide, catalyst is removed from the mixture by water washing.

The resultant mixture is distilled to remove unreacted oil and a reactive petroleum resin having a softening point of 36° C., Parrett color of C-½ and a bromine number of 59 is obtained in a yield of 32% based on the starting material. Maleic anhydride is added to the reactive petroleum resin thus prepared in a manner identical to that of Example I, thereby to obtain a light brownish and perfectly transparent sizing solution having a solid content of 30 weight percent. The solution, obtained from the product by diluting it to a solid content of 2 weight percent, is also perfectly transparent, having a pH of 9.3.

EXAMPLE III

The residual oil from the fraction containing the $C_6$ and higher fractions and boiling up to 280° C. from which the benzene-toluene-xylene fraction has been removed as described in Example II is distilled to obtain a fraction having an Engler boiling range of 150° to 200° C. 75% of the latter fraction is mixed with 25% of isoprene to make up a starting material having a conjugated diolefin content of 50% and an "unsaturated aromatic hydrocarbon" content of 49%.

The starting material is admixed with 0.1% by weight of boron trifluoride and is reacted at 60° C. at three atmospheres for 24 hours. After neutralization with sodium hydroxide and washing with water, the reaction mixture is distilled to remove unreacted oil and a reactive petroleum resin having a softening point of 52° C., Barrett color of C-1½ and a bromine number of 60 is obtained in a yield of 42% based on the starting material. 8 weight parts of maleic anhydride is added to 100 weight parts of the reactive petroleum resin thus prepared, heating it to 200° C., and reacted for 6 hours. Then sizing agent is produced. An alkaline solution prepared by dissolving 11.7 weight parts of potassium hydroxide into 115 parts by weight of water is added to a mixture consisting of 100 weight parts of this resin, to which maleic anhydride has been added, 10 parts by weight of rosin (saponification value of 170), and 5 parts by weight of maleic modified rosin (prepared by adding 0.5 mol of maleic anhydride to 1 mol of rosin, the saponification value being 300), agitation being continued for 3 hours at 85° C., thereby to obtain a uniform, transparent and concentrated sizing agent. A sizing agent having 30% of solid content obtained by diluting the above-said sizing agent with water has a light brownish color and is perfectly transparent, and when diluting it again to a solid content of 2 weight percent, the resulting aqueous solution is also perfectly transparent and the pH is 9.5.

EXAMPLE IV

A fraction boiling at 20° to 280° C. obtained as a byproduct from steam cracking of petroleum naphtha is distilled and separated into a 20° to 70° C. fraction and a residual fraction containing higher fractions boiling up to 280° C. The residual fraction is distilled to separate the benzene-toluene-xylene fraction and the remaining oil is distilled to obtain a fraction having an Engler boiling range of 145° to 200° C. 40% by weight of the latter fraction are mixed with 60% by weight of 20° to 70° C. fraction to make up the starting material. Such starting material has a diene value index of 24.8 and an "unsaturated aromatic hydrocarbon" content of 31%, and is admixed with 1.2% by weight of boron trifluoride-ethyl ether complex and reacted at 35° C. under about two atmospheric pressure for five hours. The reaction mixture is neutralized with sodium hydroxide and the catalyst is removed by water washing. Unreacted oil and low molecular polymers are removed by distillation under atmospheric pressure and further by vacuum distillation.

A reactive petroleum resin having a softening point of 39.5° C., Parrett color of C-½ and a bromine number of 55 is obtained. Yield is 33.8% by weight based on starting material. To 100 weight parts of the reactive petroleum resin thus obtained, 6 weight parts of maleic anhydride is added, heating the mixture to 180° C., the reaction being effected for 5 hours. Then a sizing agent is produced. An alkaline solution prepared by dissolving 12.4 weight parts of potassium hydroxide in 130 weight parts of water is added to a mixture consisting of 100 weight parts of this resin, to which maleic anhydride has been added, 20 weight parts of rosin (saponification value 170) and 10 parts of maleic rosin (saponification value 300). By continuing the agitation of the thus obtained mixture for 3 hours at 85° C., a uniform, transparent, and concentrated aqueous solution is obtained. The solution prepared by diluting it with water to a solid content of 30%, is light brown in color, is perfectly transparent; an aqueous solution obtained by diluting the aforesaid aqueous solution in a solid content of 2 weight percent, is also perfectly transparent, and the pH is 9.5.

COMPARATIVE EXAMPLE I

Thermally treating a fraction boiling at 20–140° C., obtained by steam cracking of naphtha, and dimerizing cyclopentadiene contained therein, yields a product of which the content of conjugated diolefin of the cracked oil is 60%, and the content of unsaturated aromatic compound is less than 1%. With this cracked oil as a starting material, adding thereto 0.4 weight percent of boron trifluoride-ethyl ether complex, reacting the mixture for 5 hours at 20° C., treating it in a manner similar to that of Example I, a petroleum resin is obtained.

The softening point of this resin is 56° C., the hue 2, the bromine number 65, and the yield is 30 weight percent.

To 100 weight parts of the petroleum resin thus obtained, 6 weight parts of maleic anhydride is added, heated to 170° C., and made to react for 5 hours. A sizing solution having a solid content of 30% obtained by similar process as in Example IV from the petroleum resin, to which the maleic anhydride has been added, is semi-transparent and is brownish colored. An aqueous solution having a solid content of 2% obtained by diluting the above-said aqueous solution is also semi-transparent, and the pH is 9.6.

COMPARATIVE EXAMPLE 2

The conjugated diolefin content of a starting oil obtained by mixing 90 weight parts of a 140–220° C. fraction, obtained by steam cracking of naphtha, and 10 weight parts of cracked oil used in Comparative Example 1, is 8%, and the content of unsaturated aromatic compound is 80%. To this oil, 0.4 weight percent of boron trifluoride-ethyl ether complex is added, the mixture is made to react for 5 hours at 40° C., and the resulting mixture treated as in Example I, patroleum resin having a softening point of 78° C., hue 1½, bromine number 30 being obtained, at a yield of 25 weight percent.

To 100 weight parts of the petroleum resin thus obtained, 6 weight parts of maleic anhydride is added, heated to 200° C., and made to react for 8 hours. A sizing solution having a solid content of 30% prepared from the petroleum resin so added with maleic anhydride, in a similar manner as in Example IV is emulsive. The product having a solid content of 2% by diluting said sizing agent with water is also emulsive, having a pH of 9.5, and separates into a water layer and a solid layer after standing for one week.

COMPARATIVE EXAMPLE 3

Thermally treating a fraction boiling at 20–280° C. is obtained by steam cracking of naphtha, dimerizing cyclopentadiene contained therein is dimerized and removed.

A hydrocarbon mixture, in which conjugated diolefin content is 17% and the unsaturated aromatic hydrocarbon content is 15%, is obtained.

Said hydrocarbon mixture is used as a starting material, adding thereto 0.4 weight percent of boron trifluorideethyl ether complex, reacting the mixture for 3 hrs. at 20° C., treating it in a manner similar to that of Example I, a petroleum resin is obtained.

The softening point of this resin is 36° C., the hue 2, the bromine number 32, and the yield is 21 weight percent.

To 100 weight parts of the petroleum resin thus obtained, 6 weight parts of maleic anhydride is added, heated to 170° C., and made to react for 5 hours. A sizing solution having a solid content of 30% obtained by similar process as in Example IV from the petroleum resin, to which the maleic anhydride has been added, is emulsive. The product having a solid content of 2% by diluting said sizing agent with water is also emulsive, having a pH of 9.5 and separate into a water layer and solid layer after standing for one week.

EXAMPLE V

Using the sizing agents prepared in Examples I–IV and Comparative Examples 1, 2 and 3 tests were carried out in the following manner:

A pulp slurry containing 2 weight percent of bleached sulfate pulp which has been beaten to a freeness of 41° S-R is introduced into a beater, to which each of said sizing solution is charged in an amount shown in the Table 1, and the ingredients are mixed. Then there is added thereto aluminum sulfite so as to give a pH of 4.5. Paper is prepared from this slurry by hand laying.

Sizing degree (in second) is measured by Stockigt method (JIS P–8122) at four points per sheet of paper. Three sheets each of the same sample are used and average sizing degree is shown in Table 1. The weight of each of the paper was set to 60 g./m.$^2$.

TABLE 1.—SIZING DEGREE (SECOND)

| Added amount of sizing agent (wt. percent to pulp) | 0.5 | 1.0 | 1.5 | 2.0 |
|---|---|---|---|---|
| Sizing agent of— | | | | |
| Example I | 26.0 | 36.5 | 45.4 | 50.2 |
| Example II | 27.0 | 37.0 | 46.7 | 52.4 |
| Example III | 26.4 | 36.4 | 44.3 | 49.7 |
| Example IV | 26.5 | 37.0 | 47.0 | 52.7 |
| Example V | 28.5 | 38.0 | 48.5 | 54.0 |
| Comparative Example 1 | 10.7 | 15.4 | 19.4 | 24.2 |
| Comparative Example 2 | 15.6 | 20.2 | 22.4 | 28.3 |
| Comparative Example 3 | 13.2 | 18.6 | 20.2 | 25.3 |
| Maleic modified rosin sizing agent | 28.0 | 36.3 | 40.5 | 46.3 |
| Rosin sizing agent | 20.0 | 24.2 | 31.5 | 38.4 |

As is clear from the foregoing table, in the sizing agent obtained by the reactive petroleum resin according to the present invention, when compared with the cases of rosin sizing agent, or maleic modified sizing agent, the sizing degrees are about the same when the addition of sizing agent to pulp is 0.5%, but at a higher addition they show by far more excellent values. In contrast, sizing agents prepared from petroleum resin obtained by processes other than that of the present invention, show considerably low sizing degrees as compared with the sizing agents of the rosin series.

EXAMPLE VI

By using 1% (with respect to pulp) of sizing agent obtained by Example IV, and changing the added amount of aluminum sulfite in a similar manner to that of Example V so as to change the pH from 2.5 to 7, the relations between the pH and the sizing degree are obtained as shown in the accompanying FIG. 1 of drawing. For comparison, that of the maleic modified rosin sizing agent is also shown.

As is evident from the drawing, in the case of rosin sizing agent, the sizing degree decreases rapidly when the pH at the making of paper is other than 4.5, but in the case of the sizing agent prepared from the reactive petroleum resin according to the present invention, a high sizing degree is obtained in a wide range of pH values, with 4.5 as its center.

What is claimed is:
1. A water-soluble sizing agent obtained by reacting 100 parts by weight of a resin with 3 to 5 parts by weight of a member selected from the group consisting of acrylic acid, methacrylic acid, maleic acid, tetrahydrophthalic acid and anhydrides thereof at a temperature of 100 to 250° C.; said resin being prepared by polymerizing hydrocarbon mixture having an unsaturated aromatic hydrocarbon content in the range of 15 to 80% by weight and a conjugated diolefin content in the range of 20 to 85% by weight in the presence of 0.01 to 5% by weight of boron trifluoride catalyst at a temperature from −30° to +80° C. for 10 minutes to 24 hours, decomposing and removing said catalyst by adding a basic agent, separating unreacted hydrocarbons and low molecular polymers by evaporation, said hydrocarbon mixture being selected from the group consisting of:
(a) a mixture of a $C_5$ fraction and a fraction having boiling range from 140° C. to 200° C., said fractions being obtained by fractionating a thermally cracked petroleum oil fraction containing unsaturated hydrocarbons and having a boiling point ranging from 20° C. to 280° C.;
(b) a fraction obtained by adding individually cyclopentadiene, dicyclopentadiene, methylcyclopentadiene, isoprene, piperylene or other cyclo- or aliphatic-conjugated diolefins, styrene, α-methylstyrene, indene and other unsaturated aromatic hydrocarbon to (a);
(c) a fraction obtained by adding combinations of cyclopentadiene, methylcyclopentadiene, isoprene, piperylene and other cyclo- or aliphatic-conjugated diolefins, styrene, α-methylstyrene, indene and other unsaturated aromatic hydrocarbons to (a).

2. A process according to claim 1, wherein the diene value index of said hydrocarbon mixture is in the range of 15 to 80.

References Cited

UNITED STATES PATENTS

| 3,279,975 | 10/1966 | Yoshii et al. | 260—78.4 D |
| 3,211,683 | 10/1965 | Arakawa et al. | 260—78.4 D |
| 2,770,613 | 11/1956 | Tegge et al. | 260—82 |
| 2,994,689 | 8/1961 | Banes et al. | 260—82 |

JOSEPH L. SCHOFER, Primary Examiner

A. HOLLER, Assistant Examiner

U.S. Cl. X.R.

260—78.4 D, 82, 880 R